Patented Oct. 20, 1953

2,656,328

UNITED STATES PATENT OFFICE 2,656,328

ACRYLONITRILE POLYMER SOLUTIONS AND ARTICLES FORMED THEREFROM

John R. Caldwell, Kingsport, Tenn., assignor to Eastman Kodak Company, Rochester, N. Y., a corporation of New Jersey No Drawing. Application May 18, 1951, Serial No. 227,103

6 Claims. (Cl. 260—30.4)

This invention relates to a new composition of matter containing acrylonitrile polymers and to methods of forming the compositions into shaped articles and to shaped articles produced therefrom, such as filaments, sheets and molded products. More particularly this invention relates to polyacrylonitrile (polymerized vinyl cyanide), and copolymers, interpolymers, and graft polymers of polyacrylonitrile in which a large or a smaller proportion of the polymer is polyacrylonitrile in solution in, or plasticized with, an N-substituted ethylene carbamate.

Such polyacrylonitrile compositions have desirable physical and chemical properties such as toughness, resistance to bacteria and insolubility in and resistance to many organic solvents. Because of the inherent resistance of the polyacrylonitriles to organic solvents, their use for the production of tough, flexible articles such as filaments, fibers, thin sheeting and the like has been until recently retarded. Moreover, of the organic solvents which can dissolve the polyacrylonitriles, several of them are not too desirable because they introduce disadvantageous properties and characteristics into the formed product which, in turn, often must be processed out of the polymer by additional expensive operations before a satisfactory product can be made. Certain of the solvents heretofore employed are also limited in extent of use not being able to dissolve such polyacrylonitriles containing higher percentages of acrylonitrile. In other instances the solvents are capable of only forming liquid solutions but are incapable of plasticizing the polyacrylonitriles so that extrusion and molding compositions cannot be made therefrom.

Certain of the class of solvents described in the instant invention can serve as solvents for polyacrylonitrile spinning solutions from which filaments and yarns can be spun by either wet or dry spinning processes and others of this class can be employed as plasticizers for polyacrylonitrile molding and extrusion compositions. In the latter case the plasticizers are incorporated with the polyacrylonitriles on hot milling rolls as is understood by those familiar with this art.

An object of the invention is to provide new compositions of matter from which filaments, sheets, and molded or extruded articles can be produced.

Another object of the invention is to provide a new class of solvents and plasticizers for polyacrylonitrile and its copolymers, interpolymers, and graft polymers in which a substantial portion of the polymer is polyacrylonitrile.

Still another object of the invention is to provide a class of solvents of the type herein described whose water solubility may be varied in such manner as to give solvents suitable for wet, and dry spinning of fibers.

Yet another object of the invention is to provide a class of plasticizers which are water insoluble and are therefore desirable for use with the aforesaid polyacrylonitriles.

Other objects will appear hereinafter.

In acordance with the invention, these and other objects depend on my discovery of a new solvent class for polyacrylnitriles and are generally attained by dissolving or mixing the polyacrylonitrile, its copolymers, interpolymers and graft polymers, in which a substantial portion of the polymer is polyacrylonitrile, in an N-substituted ethylene carbamate having the general formula:

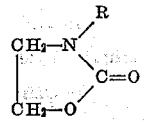

wherein R represents an alkyl group e. g. methyl, ethyl, hydroxy ethyl, ethyl hexyl, cyclohexyl, n-propyl, isopropyl, n-butyl, isobutyl, sec.-butyl, n-amyl, n-hexyl, cyclohexyl and cyano or an aryl group, e. g., phenyl tolyl, xylyl, hydroxyphenyl, methoxyphenyl, p - cyano - phenyl, m-chlorophenyl, methylphenyl, pyridyl and a naphthyl group.

I have found that such compounds will dissolve 100% polyacrylonitrile as well as polymers containing a lesser content of acrylonitrile.

In the following paragraphs the attainment of other features of the invention is further described.

Typical N-substituted ethylene carbamates coming within this general formula, which may be employed advantageously as solvents for the various polyacrylonitrile compounds mentioned herein are the following:

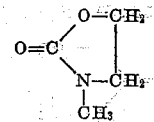

N-methyl ethylene carbamate

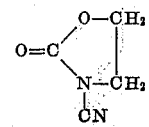

N-cyanoethylen carbamate

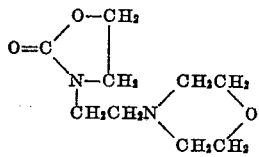

N-(β-ethyl morpholine) ethylene carbamate

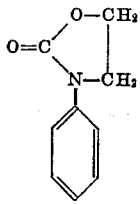

N-phenyl ethylene carbamate

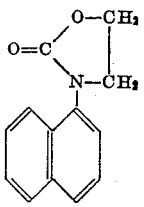

N-(α-naphthyl) ethylene carbamate

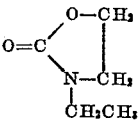

N-ethyl ethylene carbamate

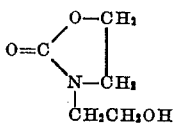

N-(β-hydroxy ethyl) ethylene carbamate

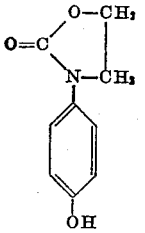

N-(p-hydroxyphenyl) ethylene carbamate

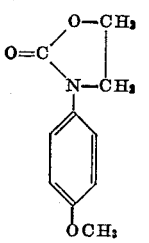

N-(p-methoxyphenyl) ethylene carbamate

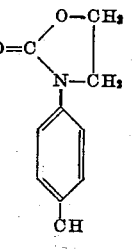

N-(p-cyanophenyl) ethylene carbamate

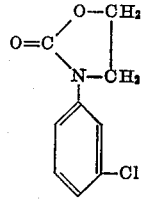

N-(m-chlorophenyl) ethylene carbamate

These N-substituted ethylene carbamates may be prepared by reacting diethyl carbonate, or phosgene, with β-hydroxy amines. The following general equation illustrates the reaction with diethyl carbonate:

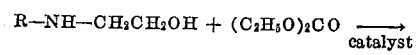

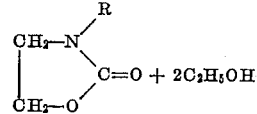

wherein R is any one of the substituent groups previously listed.

The reaction between ethyl carbonate and the hydroxy amine is catalyzed with a trace of metallic sodium or with sodium or potassium ethoxide. When phosgene is employed, the reaction is conducted in the presence of 2 moles of sodium hydroxide in order to remove the HCl formed. A total of two-mole-proportions of ethanol is removed, and the resulting product purified either by recrystallization or distillation depending upon the nature of the compound.

These compounds, depending upon the N-substituent group, possess different degrees of water solubility, and thereby offer solvent molecules adaptable for specific purposes.

I have found that when R is the above carbamate formula contains six or more carbon atoms, they are insoluble in water. However, such compounds are effective plasticizers for acrylonitrile polymers. The carbamates containing the following groups in the R position are particularly good as plasticizers; cyclohexyl, n-hexyl, 2 ethylbutyl, heptyl, 2 ethylhexyl, n-octyl, phenyl, tolyl, and xylyl.

Up to the present time, most solvents and plasticizers have been quite water soluble. This fact has, of course, precluded their use under many conditions. However, with the advent of certain of the compounds described above, this difficulty has been overcome for the first time in a practical manner.

PREPARATION OF N-SUBSTITUTED ETHYLENE CARBAMATES

Example 1

To a mixture of 118 gms. (1 mole) of diethyl carbonate and 137 gms. (1 mole) of N-phenyl ethanolamine in a flask fitted to an efficient fractionating column is added a small piece of sodium metal. This mixture is heated to approximately 105° C. at which point a vigorous reaction takes place and the sodium disappears. Heat is further applied until refluxing commences, and a total of 92 gms. (2 moles) of ethyl alcohol is collected. The hot residue from the reaction flask is then poured into a small amount of hot ethanol, from which it is allowed to crystallize. The N-phenyl ethylene carbamate crystallizes as white plates having a melting point of 118° C.

Example 2

To a mixture of 118 gms. (1 mole) of diethyl carbonate and 89 gms. (1 mole) of N-ethyl ethanolamine in a flask fitted with an efficient fractionating column is added a small piece of sodium metal. This mixture is heated to approximately 100° C. at which point a vigorous reaction takes place and the sodium disappears. The application of heat is continued further until 92 gms. (2 moles) of ethyl alcohol are collected. The residue is then distilled and comes over as a clear, mobile liquid at 161° at 40 mm. pressure.

Example 3

To a mixture of 118 gms. (1 mole) of diethyl carbonate and 105 gms. (1 mole) of diethanolamine in a flask fitted with an efficient fractionating column is added a small piece of sodium. Heat is applied until the sodium disappears with a vigorous reaction, and a total of 92 gms. (2 moles) ethanol is collected. In this case, the last 46 gms. of ethanol is collected under vacuum with gentle heating to avoid decomposition of the product. The product N-($\beta$-hydroxyethyl) ethylene carbamate, is used without further purification to avoid decomposition.

POLYMER SOLUTION PREPARATION

The solutions were prepared by adding the powdered polymer slowly to the hot N-substituted ethylene carbamate solvent and stirring. In the preparation of solutions for spinning fibers, it is desirable to grind the polymer to a particle size of 40 mesh or finer in order to facilitate dissolving. Instead of employing hot solvent, the procedure may, of course, be varied by preparing a cold slurry of the polymer and solvent, in the case of liquid solvents, and gradually heating to about 130° C. In the case of solid solvents or plasticizers, the compound may be melted and the polymer slowly added with stirring to effect solution, or an intimate mixture of the solvent crystals and polymer powder may be made which later forms an homogeneous solution on heating.

The following examples further illustrate my invention:

Example 4

One hundred gms. polyacrylonitrile and 600 gms. N-methyl ethylene carbamate are mixed at 10° C. and the suspension is stirred while it is heated to 60–70° C. A clear solution is formed in 40 minutes. This solution shows no tendency to gel or change in viscosity during 2 weeks' storage.

The solution is extruded through a multi-hole spinnerette into a coagulating bath consisting of 60 parts water—40 parts N-methyl ethylene carbamate. The filaments are washed with water and dried at 110°–120° C. The yarn is drafted 600 per cent in a steam chamber at 170–180° C. Fibers having a tenacity of 4.0 grams per denier and 21 per cent elongation are obtained.

Example 5

A polymer is prepared having the composition 88 per cent acrylonitrile—12 per cent isopropenyl acetate. Ten parts of the polymer are dissolved in 70 parts of N-ethyl ethylene carbamate. The solution is spun as described in Example 1.

Example 6

A polymer is prepared having the composition 84 per cent acrylonitrile—16 per cent methyl acrylate. One hundred parts of the polymer are mixed on hot rolls with 24 parts of N-isobutyl ethylene carbamate. The plasticized resin is then cooled and granulated. It can be molded by compression or injection molding methods to give hard, tough product.

Example 7

A slurry of 20 gms. of a polyacrylonitrile-isopropenyl acetate copolymer and 80 gms. of N-ethyl ethylene carbamate is heated to 130° C. over a 30-minute period. The solution so formed is then forced through a spinnerette as fibers into either a wet bath of water, ethanol or acetone, to remove the solvent. The filaments are dried at an elevated temperature. A more viscous solution which can be obtained by increasing the copolymer content to 75% may be forced through a spinnerette to form fibers from which the solvent may be removed by an evaporative medium such as air or steam.

Example 8

A polymer is prepared having the composition of 85% acrylonitrile—15% methacrylnitrile. One hundred parts of the polymer are mixed on heated rolls with 30 parts N-phenyl ethylene carbamate. The plasticized resin is cooled and granulated. It can be molded by compression or injection molding methods.

Example 9

An emulsion polymer is prepared having the composition 90% acrylonitrile—10% methallyl alcohol. The resin is isolated as a fine powder. One hundred parts of the resin are thoroughly mixed with a solution of 33 parts N-cyclohexyl ethylene carbamate in 900 parts methyl alcohol. The methyl alcohol is then evaporated while the mixture is being agitated. This treatment disperses the plasticizer uniformly throughout the polymer residue. The product can be molded or extruded by the usual methods.

Example 10

The polymer of Example 8 was similarly mixed with 25 parts of N-(2-ethylhexyl) ethylene carbamate and another molding and extrusion composition resulted.

Example 11

An emulsion polymer is prepared having the composition of 87% acrylonitrile—13% ethyl acrylate. The emulsion contains 100 parts resin dispersed in 300 parts water. Twenty-eight parts N-(o-tolyl) ethylene carbamate are added to the emulsion and the mixture is vigorously agitated to disperse the plasticizer. Sodium sulfate is then added to coagulate the emulsion. The precipitate is washed with water to remove sodium sulfate and then dried. The final product consists of an intimate mixture of polymer and plasticizer. The product can be molded or extruded by the usual methods.

Example 12

Thirty grams of polyacrylonitrile or one of its copolymers is intimately mixed with 100 grams of N-phenyl ethylene carbamate. This mixture is then heated until a viscous solution results. This viscous mass may then be extruded or compressed to form useful, shaped articles, or it may be formed into fibers.

When the carbamate is substituted on the N position by a methyl, ethyl, or propyl group 100% polyacrylonitrile can be dissolved thereby. When R is a higher substituent than propyl, the carbamate will dissolve or plasticize interpolymers that contain less than about 90% acrylonitrile.

Interpolymers of 80% or more acrylonitrile with the following monomers can be used: isopropenyl acetate, vinyl acetate, vinyl chloride, methallyl alcohol, methyl arcylate, allyl acetate, ethyl α-acetamide acrylate, and methyl methacrylate.

When employed as plasticizers, the N-substituted carbamates can be mixed with the polyacrylonitrile resins on hot milling rolls or in mixers such as Banbury type mixers.

Other polymeric materials can be added to the solutions as modifying agents, for example, proteins, cellulose organic acid esters, cellulose ethers, polyamides, polyesters, vinyl polymers, etc.

What I claim and desire to secure by Letters Patent of the United States is:

1. As a new composition of matter a polymer of acrylonitrile, containing in the polymer molecule less than about 90% by weight of acrylonitrile, plasticized with a water-insoluble compound having the general formula:

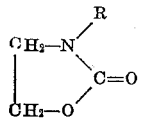

wherein R represents a member selected from the groups consisting of iso-butyl, n-hexyl, cyclohexyl, 2-ethylbutyl, heptyl, 2-ethyl hexyl, n-octyl, phenyl, tolyl and xylyl groups.

2. As a new composition of matter a molding composition containing 100 parts of a copolymer consisting of 84% acrylonitrile and 16% methyl acrylate with 24 parts of N-isobutyl ethylene carbamate plasticizer.

3. As a new composition of matter a molding composition containing 100 parts of a copolymer consisting of 85% acrylonitrile and 15% methacrylonitrile with 30 parts of N-phenyl ethylene carbamate plasticizer.

4. As a new composition of matter a molding composition containing 100 parts of a copolymer consisting of 90% acrylonitrile and 10% methallyl alcohol with 33 parts N-cyclohexyl ethylene carbamate plasticizer.

5. As a new composition of matter a molding composition containing 100 parts of a copolymer consisting of 90% acrylonitrile and 10% methallyl alcohol with 33 parts of N-(2-ethyl hexyl) ethylene carbamate plasticizer.

6. As a new composition of matter a molding composition containing 100 parts of a copolymer consisting of 87% acrylonitrile and 13% ethyl acrylate with 28 parts N-(o-tolyl) ethylene carbamate plasticizer.

JOHN R. CALDWELL.

References Cited in the file of this patent

UNITED STATES PATENTS

| Number | Name | Date |
| --- | --- | --- |
| 2,404,714 | Latham | July 23, 1946 |
| 2,558,793 | Stanin et al. | July 3, 1951 |